March 11, 1924. 1,486,219
W. E. ADAMS
AUXILIARY AIR INLET FOR INTERNAL COMBUSTION ENGINES
Filed Feb. 11, 1922
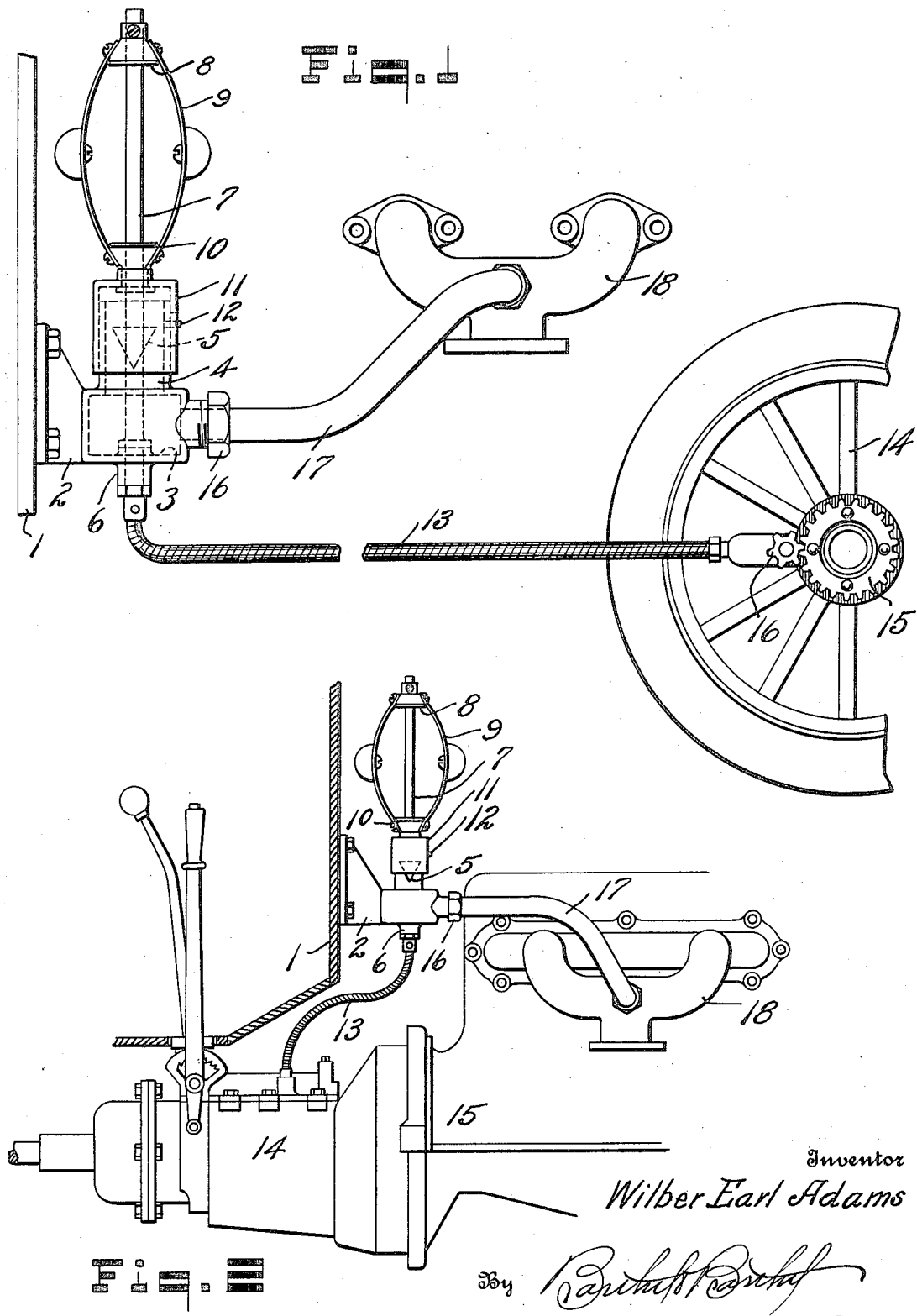
Inventor
Wilber Earl Adams Patented Mar. 11, 1924.

1,486,219

UNITED STATES PATENT OFFICE.

WILBER EARL ADAMS, OF DETROIT, MICHIGAN.

AUXILIARY AIR INLET FOR INTERNAL-COMBUSTION ENGINES.

Application filed February 11, 1922. Serial No. 535,685.

*To all whom it may concern:*

Be it known that I, WILBER EARL ADAMS, a citizen of the United States of America, residing at Detroit, in the county of Wayne and State of Michigan, have invented certain new and useful Improvements in Auxiliary Air Inlets for Internal-Combustion Engines, of which the following is a specification, reference being had therein to the accompanying drawings.

This invention relates to an auxiliary air inlet device for internal combustion engines, and my invention aims to provide means for automatically supplying air to the intake manifold of an engine, so that the air may commingle with ingoing fuel and place the fuel in better condition for combustion, the air contributing hydrogen and oxygen to the fuel so that it will be enriched in its properties and produce greater power with a minimum expenditure of fuel. The air will also decrease carbonization in the cylinders, and act as a scavenger when the engine is idling with the supply of fuel cut off, for instance, when coasting.

My invention further aims to provide an auxiliary air inlet device for internal combustion engines wherein the admission of air to the engine is controlled by the speed of the engine, direct or indirect. For instance, the control may be from a wheel of a vehicle driven by the engine or from the transmission mechanism of a vehicle or any driven part of the vehicle.

My invention further aims to provide a simple, durable, and inexpensive device that may be readily installed without any material modification. In the power plant of a motor driven vehicle, and the construction by which I attain the above and other results will be hereinafter specifically described and then claimed.

Reference will now be had to the drawing, wherein—

Figure 1 is a side elevation of the air inlet device relative to a vehicle wheel, intake manifold and dash, these three elements being parts of a conventional form of motor driven vehicle, and Fig. 2 is a similar view illustrating the air inlet device controlled from the transmission mechanism of a power plant.

The reference numeral 1 denotes a dash or other suitable support provided with a bracket 2 having an air chamber 3 formed therein and on top of the bracket is a valve body or sleeve 4 communicating with the air chamber 3 and provided with a triangular or V shaped wall opening 5 which admits air to the sleeve 4 and the chamber 3.

The bottom of the bracket 2 has a bearing 6 for a vertically disposed governor shaft 7 and on the upper end of said shaft is a fixed head 8 connected by resilient governor arms 9 to a slidable head 10 on the governor shaft above the valve body 4. Suitably connected to the slide head 10 is an inverted cup shaped valve 11 which telescopes or slides on the sleeve or valve body 4, said valve when inactive closing the air inlet opening 5. The valve 11 is non-rotatable relative to the slide head 10 and is prevented from rotating on the valve body 4 by a pin 12 of said valve body extending into a slot of the valve 11. When the governor shaft 7 is driven centrifugal force will cause the governor arms 9 to raise the slide head 10, and the opening 5 will be gradually uncovered to admit air to the valve body 4 and the chamber 3 of the bracket 2.

Suitably connected to the lower end of the governor shaft 7 is a conventional form of flexible shaft 13 and this shaft extends to the driven part of a power plant. For instance, as shown in Fig. 1 a motor vehicle wheel 14 has a large gear wheel 15 connected thereto and this large gear wheel meshes with a small gear wheel 16 in driving relation to the flexible shaft 13, so that when the vehicle wheel 14 is driven the speed of said wheel will control the operation of the governor which operates the valve 11. As shown in Fig. 2 the flexible shaft 13 may extend into the transmission housing 14 of a power plant 15 and said flexible shaft be driven by said power plant.

The air chamber 3 of the bracket 2 has a connection 16 for a conduit 17 and this conduit is connected to the intake manifold 18 forming part of the power plant. When the power plant is placed in operation and a predetermined road speed is attained at the wheel 14, the governor is actuated to operate the valve 11 and air is admitted at the opening 5 and drawn into the intake manifold 18, where it commingles with the fuel or explosive mixture provides a leaner mixture, saves gasoline, and under such speed does not cause a reduction of speed, although if the speed is materially raised the lean mixture will eventually cause a reduction of speed.

From the foregoing it will be observed that my invention in its broadest aspect involves automatic means for admitting air to the intake manifold of an internal combustion engine, used as the power plant of a vehicle, when the road speed of the vehicle becomes excessive. The supply of air and duration of such supply being controlled by a governor actuated direct from a driven part of the automobile, in contradistinction to gas saving devices controlled by the suction, reduction of atmospheric pressure, or direct action of the engine, or by the velocity of fuel taken into the engine.

What I claim is:—

1. An auxiliary air inlet device for the manifold of an internal combustion engine, comprising a bracket having an air chamber, a valve body on the air chamber of said bracket adapted to receive air, a conduit attached to the bracket air chamber and adapted to conduct the air to the manifold of the internal combustion engine, a valve slidable exteriorly of said valve body controlling the admission of air to the valve body, a governor shaft extending through said bracket air chamber and said valve body and governor means on the upper end of said shaft adapted to adjust said valve.

2. An auxiliary air inlet device as in claim 1, wherein the valve body is in the form of a sleeve having a side wall V-shaped opening, and said governor shaft is adapted to be driven from an automobile wheel.

In testimony whereof I affix my signature in presence of two witnesses.

WILBER EARL ADAMS.

Witnesses:
   CHAS. W. STAUFFIGER,
   KARL H. BUTLER.